United States Patent Office 2,991,158
Patented July 4, 1961

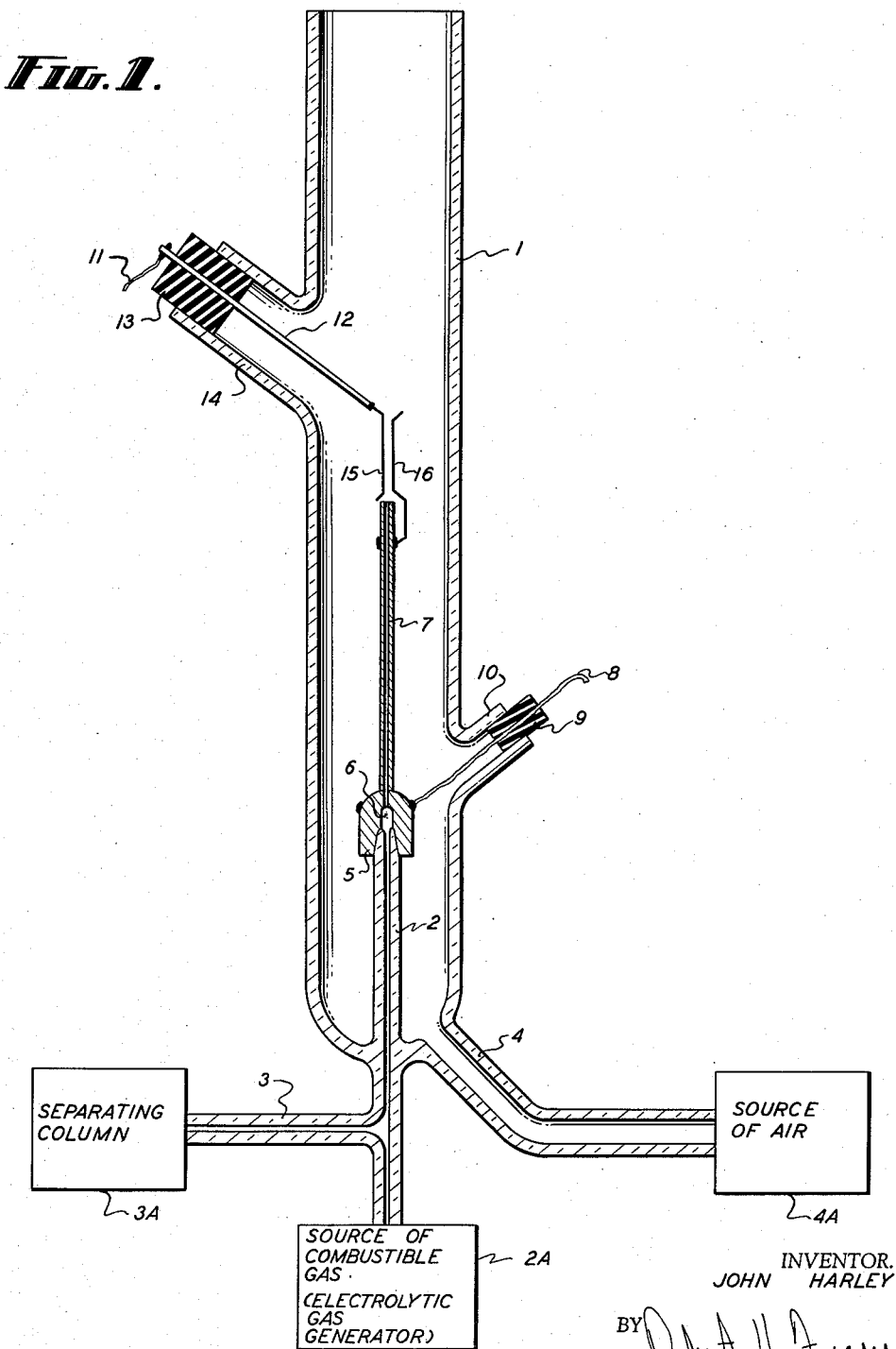

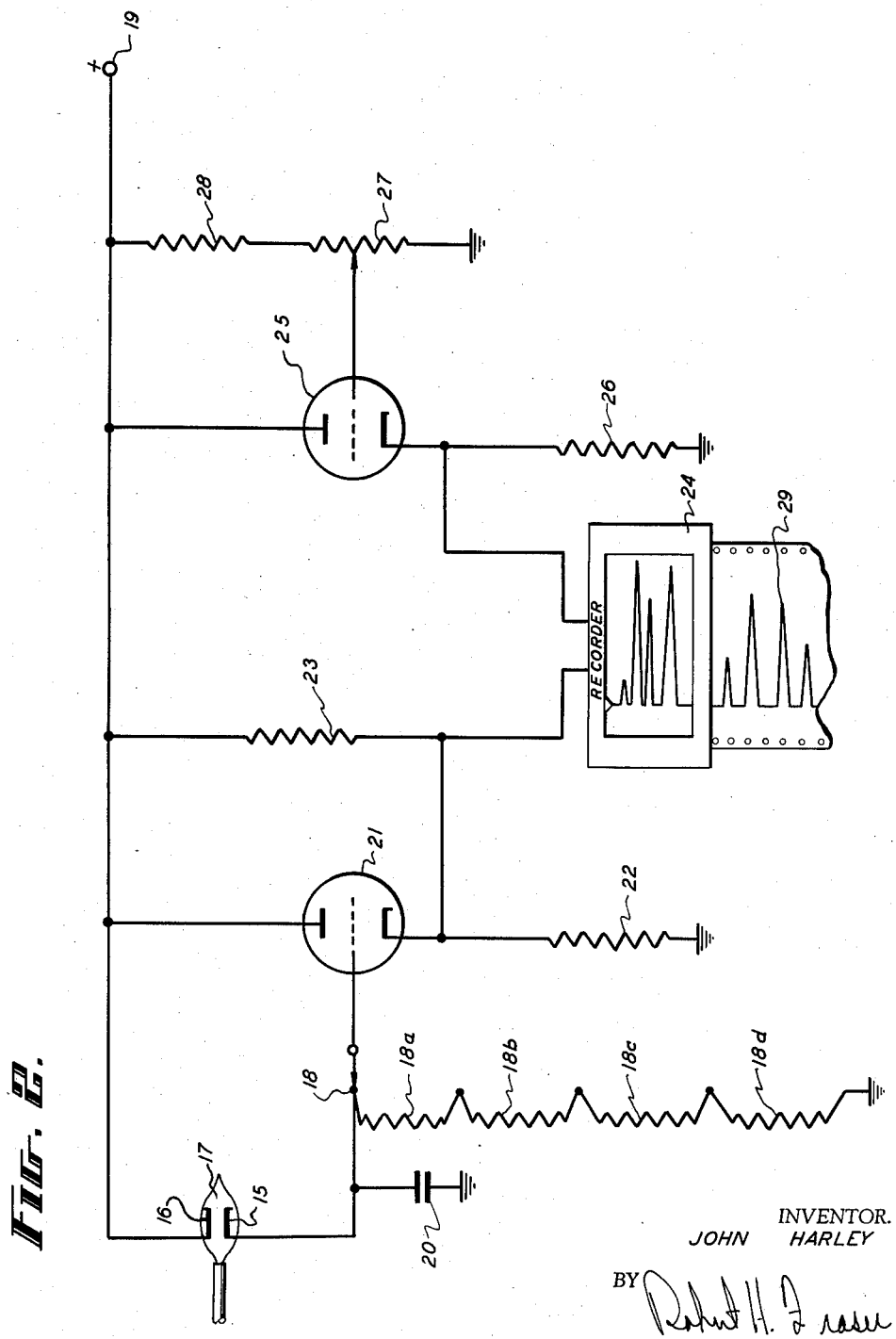

2,991,158
APPARATUS FOR THE ANALYSIS AND/OR DETECTION OF SUBSTANCES BY GAS CHROMATOGRAPHY
John Harley, Glen Heath, Glenlauriston, P.O. Clubview, Pretoria, Transvaal, Union of South Africa
Filed Nov. 12, 1958, Ser. No. 773,463
Claims priority, application Union of South Africa Nov. 20, 1957
18 Claims. (Cl. 23—254)

The present invention relates to an improved method and apparatus for the analysis and/or detection of substances by gas chromatography.

"Gas chromatography" may be defined as an operation in which a gasiform medium consisting of a mixture of at least two constituents is passed through a separating zone of adequate length or depth containing a material which retains the constituents for different periods of time (retention times), so that the various constituents appear consecutively at different times at the other end of the said zone.

Usually gas chromatography involves the use of a carrier gas, e.g. nitrogen or hydrogen, and the injection of a measured small quantity of a sample to be examined, e.g. a mixture of vaporizable organic substances or a sample of a gas to be examined into the carrier gas, which is about to enter the said separating zone.

Among the pioneers of one type of gas chromatography are Martin and James. In 1952 these authors reported in the "Journal of Biochemistry," vol. 50, page 679, 1952, that by incorporating a sample of the vapors of a mixture of organic liquids in a carrier gas and pressing the same through a specially prepared column, a separation of the said mixture of liquids into its components took place within the column, and pure fractions emerged in the carrier gas. This was an important advance since previously fractional distillation methods were employed which required much larger quantities of liquid, but had inferior separating capacity.

This method has, since then, found a very wide application in the separation of mixtures of organic liquids in their components.

Research on the field of gas chromatography has been directed principally into two broad fields, namely the development of the separating zone and the column itself, and the refinement of methods of detecting the pure fractions.

For analytical purposes, the separating zone or column usually consists essentially of a tube of glass or other suitable material, e.g. from four to twenty feet long depending on the degree of separation required, with an internal diameter of, e.g. from three to ten millimeters. This tube is packed with a crushed and screened solid substance such as kieselguhr, Carborundum, etc., with a particle size of the order of e.g. 0.1 millimeter, the said solid substance being termed the solid phase. The solid phase is wetted with a practically non-volatile liquid, termed the liquid phase. Since the liquid phase plays the greatest role in the separation, considerable research has been directed towards this, resulting in the discovery of a multitude of liquid phases which can be used for specialized separations.

For example, a small measured quantity of a sample of the liquid mixture to be analyzed is introduced, preferably from a pipette, into a carrier gas, and the vapors thus formed are swept through the separating zone or column by the gas which is usually non-polar. The said vapors pass into partial solution in the liquid phase, but are continuously driven forward by the carrier. Due to the solvent action of the liquid phase on the said vapors, they are retained in the separating zone or column for a longer period of time than if no liquid phase were present. This period is termed the retention time, and it is because of the retention time of a liquid, in particular a liquid as a function of its boiling point, that separation takes place. The effluent (the emergent vapors) consists of pure fractions, appearing in the order of their boiling temperatures.

The fractions, which are usually of the order of a few microliters, are detected and registered on a suitable recorder.

Many different types of detectors have been developed for this purpose, making use of different properties of gases. Among the detectors are the gas density balance, thermal conductivity detector, glow discharge detector, ionizing gauge detector, flame temperature detector, thermistor detector, ultrasonic detector and the capacitive detector.

All of the known detectors, however, suffer from certain disadvantages. For example, the gas density balance is very expensive and not very suitable for operation under rugged conditions such as are prevalent in industry. The thermal conductivity detector has a low sensitivity and a high noise to signal ratio. The thermistor detector suffers from similar disadvantages and can, moreover, only be employed with low temperature columns. The glow discharge detector involves elaborate equipment, in particular vacuum equipment, and manostating equipment. An additional complication is the necessity of providing this system with a variable leak. The ionizing gauge detector requires a complicated ionization gauge and also vacuum equipment. The flame temperature detector has a low sensitivity and a high noise to signal ratio. Ultrasonic detectors require large samples of gas and are, therefore, unsuitable for gas chromatographic work. The capacitive detector is very critical in operation and of a complicated construction.

Accordingly, an object of the invention is to provide a method and apparatus for the analysis and/or detection of substances by gas chromatography, which does not suffer from the aforesaid disadvantages.

In accordance with one aspect of the invention we have found that by passing the effluent gases from a separating column through or into a flame there results a change of conductivity of the flame, irrespective of whether the fractions contained in the effluent gas be combustible, semi-combustible or incombustible. Within practical limits, the conductivity changes through the flame are essentially proportional to the concentration of the fraction being passed through or into the flame, which is an important and advantageous function of any detector so employed. Although the eluted fractions are usually greatly diluted in the carrier gas, the change in conductivity is of sufficient magnitude to permit relatively easy and simple measurement, resulting in a sensitive detector which overcomes the disadvantages of the aforesaid detectors. The effluent gases from a separating column are thus passed through or into a flame in a device enabling the measurement and recording of the changes in conductivity produced in the flame by the said gas.

The said device is hereinafter referred to as a flame ionization detector.

When working with a flame ionization detector a combustible gas such as hydrogen must be employed for the production of the flame. In some cases the hydrogen or other combustible gas may also serve as the carrier. Generally, however, a gas of higher molecular weight, e.g. nitrogen is employed as the carrier, and with its content of fractions that have been separated in the separating zone or column, is admixed with the hydrogen passing to the flame. Where desired or required, however, a mixture of nitrogen or/other gas and hydrogen or the like may be employed as the carrier gas from the commencement.

The flame ionization detector, in accordance with the invention comprises a nozzle or equivalent means for the production of a gas flame, means for the passage of a gas that has issued from the gas chromatography separating zone or column into the said flame and electrodes opposite each other connected with means for indicating and/or recording the degree of ionization or changes of ionization occurring in the said flame.

A preferred embodiment of a flame ionization detector, in accordance with the invention, comprises an upright tube or like enclosing member open at the top or allowing the escape of gases of combustion, a nozzle for the production of the flame, usually centrally disposed, by means of a combustible gas passed thereinto, means for the introduction of carrier gas containing fractions separated in the gas chromatography column into the said combustible gas, a pair of electrodes of platinum wire or like material resistant to combustion, the said electrodes being positioned within the flame zone, a short distance from and, usually parallel to each other and insulated from each other, and being connected with ionization indicating and/or recording means.

A preferred embodiment of a flame ionization detector, in accordance with the invention, will be further described with reference to the accompanying drawings, in which:

FIG. 1 is a side view partially in section of a gas chromatographic analysis system utilizing a flame ionization detector in accordance with the invention; and FIG. 2 is a schematic circuit diagram of apparatus for use in conjunction with a gas chromatographic analysis system utilizing a flame ionization detector in accordance with the invention.

Referring to FIG. 1 of the drawing, there is shown a vertical chamber in the form of a tube 1 of glass or other suitable material, embodying an upwardly directed central glass tube 2 extending through the base of the tube 1 for the introduction of hydrogen or other suitable combustible gas from a source 2A. A narrow pipe 3 brings carrier gas, e.g. nitrogen issuing from a gas chromatographic separating column 3A with whatever fractions that may be carried over into the pipe 2 for admixture with the combustion gas. Air is introduced into the base of the tube 1 through a pipe 4 from a source 4A. The top of the glass pipe 2 is ground to fit within a cap 5 of conductive material, which latter is provided with a mixing space 6 into which the duct of the tube 2 leads. A nozzle 7 made of stainless steel forms a duct of an internal diameter of about 0.5 mm. making connection with the mixing space 6. The nozzle 7 also serves as a conductor for the supply voltage of the order of 100–400 volts, e.g. 150 volts, from the lead 8 which passes through an insulator 9 contained in the branch pipe 10. A standard injection needle may be used as the nozzle 7. The current input from the line 11 is introduced through a lead 12 which passes through an insulator plug 13 in the branch pipe 14. At the lower end of the lead 12, an electrode 15 is provided opposite an electrode 16 which latter is attached to the nozzle 7. The electrodes may be constructed of 0.1–0.2 millimeter platinum wire or other suitable material spaced about 1 millimeter apart over a distance of the order of 1½ centimeters. Platinum wire is preferable for the electrodes 15 and 16 due to its inherent ability to resist oxidation. With platinum wire electrodes, compounds containing sulphur may be satisfactorily detected, as chemical reaction with this element does not impair the electrical properties of the electrodes. In addition, the detector may be used at high temperatures where analysis using conventional cathetometer equipment would be impossible due to decomposition of the element wires.

In FIG. 1 there is provided a separate air inlet since even small dust particles may produce erroneous indications. Dust can be removed by passing the air through a filter (not shown) containing oil-soaked cotton-wool or other suitable material for filtering gases and connected between the tube 4 and the source of air 4A.

Where the carrier gas used in the separating column is combustible, such as hydrogen, the flame may be directly produced from the sample without requiring a separate source of combustible gas. However, where a separate source is required, as where the carrier gas is nitrogen, a preferred arrangement may utilize an electrolytic gas generator. For example, by electrolysis from water ($H_2O$) hydrogen as well as oxygen may be produced. Since the hydrogen accumulates near one electrode and oxygen near the other, an electrolytic gas generator may be employed and the hydrogen may be readily separated from the oxygen so that both combustible gas and oxygen may be supplied to the flame ionization detector of the invention from a single source. Another advantage of using an electrolytic gas generator is that an unusually constant rate of flow of the combustible gas may be achieved without the necessity for pressure reduction equipment or flow regulators. Where hydrogen is derived by electrolysis, it is only necessary to replenish the water in the gas generator from time to time. At low temperature operation, a separate outlet for water may be provided to drain the water produced when hydrogen burns. At high temperature operation, above the boiling point of water, this is unnecessary.

In operation, when a sample from the separating column 3A is introduced into the flame region, the amount of current flow between the electrodes 15 and 16 is a function of the ionization of the gases present within the flame produced by variations in the constituents of the sample. A current may be caused to flow between the electrodes 15 and 16 and the degree of ionization may be sensed by means of the apparatus illustrated in FIG. 2 in which the shaded area 17 represents the flame region surrounding the electrodes 15 and 16.

In FIG. 2 the electrodes 15 and 16 are connected serially with a plurality of resistors $18a$–$18d$ which are connected between the taps of a selector switch 18. A suitable positive operating potential, preferably well regulated, may be applied to a terminal 19 which causes a current to flow between the electrodes 15 and 16 through the resistors $18a$–$18d$ corresponding to the degree of ionization in the flame region 17. A capacitor 20 may be connected in parallel with the resistors $18a$–$18d$ to bypass unwanted alternating current components to ground.

Depending upon the position of the switch 18, a predetermined fractional part of a signal produced across the resistors $18a$–$18d$ may be applied to the control electrode of a cathode follower electron tube 21. In conventional fashion, the anode of the electron tube 21 may be connected to receive operating voltage from the terminal 19 and a cathode resistor 22 may be connected between the cathode and ground.

The cathode follower electron tube 21 operates to produce a signal at the junction between a resistor 23 and the cathode resistor 22 corresponding to the value of the current flow between the electrodes 15 and 16 which may be applied to an indicator, such as, for example, a recorder 24. The cathode follower of electron tube 21 functions essentially as an impedance matching device which produces a signal which may be applied to a relatively simple indicator or recorder, such as a 0–1 milliampere instrument. In contrast, it has previously been necessary to use relatively expensive potentiometric recorders in the 0–10 millivolt range.

In order to establish a zero indication on the indicator or recorder 24 corresponding to the condition where a current flow between the electrodes 15 and 16 represents the absence of a measurable sample, a second cathode follower electron tube 25 may be included in the circuit of FIG. 2 in which the magnitude of the signal appearing across a cathode resistor 26 may be adjusted through a suitable positioning of a potentiometer 27. The potentiometer 27 functions as a portion of a voltage divider in conjunction with the resistor 28 to apply a voltage to the grid of the electron tube 25 which produces a current flow through the cathode resistor 26 of a suitable value to apply a signal to the recorder 24 corresponding to the zero condition. The graph 29 produced by the recorder 24 is exemplary of the indication resulting from analysis of a particular sample derived from a separating column as described above.

The following list of circuit component values is given by way of example, being indicative only of one workable embodiment:

| | |
|---|---|
| Electron tube 21 | Triode section of type 6SN7. |
| Electron tube 25 | Triode section of type 6SN7. |
| Resistor 18a | 6.8 megohms. |
| Resistor 18b | 1.5 megohms. |
| Resistor 18c | 470,000 ohms. |
| Resistor 18d | 150,000 ohms. |
| Resistor 22 | 10,000 ohms. |
| Resistor 26 | 10,000 ohms. |
| Resistor 28 | 150,000 ohms. |
| Resistor 23 | 100,000 ohms. |
| Capacitor 20 | .1 microfarad. |
| Voltage applied to terminal 19 | 100–400 volts, e.g. 150 volts. |

The sensitivity of the detector is such that, for example, one molecule of benzine in a thousand of the carrier produces a current through the flame of $10^{-8}$ ampere. It has been found that an injected sample of 1 microliter produces a full scale deflection on a 1.0 milliampere recorder with a signal to noise ratio of better than 1000:1 and no observable base line drift over a wide range of operating conditions. Sensitivities of the order of one molecule of benzine in 50,000 of nitrogen are, therefore, feasible, limited only by noise such as microphony and tube drift. Tests on injected samples up to 10 microliters have been made, the reproducibility being limited only by injection precision.

When any constituent of a mixture reaches the detector with the carrier gas from the gas chromatography column, the curve on the recorder runs sharply upwards from the base line to a peak, remains at a high level and then runs back to the base line when that constituent no longer issues from the column. When the next constituent which will generally be of higher molecular weight than the first arrives in the flame, a recording is again registered accordingly.

From the areas enclosed by the curves and heights deductions can be made, both as to the types and quantities of the constituents of a mixture to be examined.

The system may be employed for the examination of complicated vaporizable mixtures. It may also be employed for control analysis in industry to be repeated at frequent intervals, e.g. every quarter of an hour. This can be greatly facilitated by the use of an automatic sampler pipette.

At medium sensitivities (1 mol per 10,000) the system, in accordance with the invention, is characterized by unusual stability and freedom from pressure, temperature, vibration, flow rate, and other fluctuations which affect, for example conventional thermal conductivity detectors. As a detector for high temperature columns (above 200° C.) it possesses many advantages not previously known which makes possible the analysis of high boiling point oils, for example.

The device, in accordance with the invention, can find a very broad application in connection with the examination, analysis or routine analysis of substances amenable to separation by gas chromatography. Examples of such analysis are the analysis of the components of mint oil, the examination of the volatizable products of coking and industrial analysis of gas mixtures, such as blast furnace gas.

What is claimed is:

1. A detector for use in conjunction with apparatus for analyzing substances by gas chromatography including the combination of a pair of spaced electrodes, a chamber surrounding the spaced electrodes, means for introducing combustible gas between the spaced electrodes to form a flame, means for introducing oxygen into said chamber for supporting the combustion of said gas, means for introducing samples of a substance to be analyzed into the flame, and an indicating device coupled to the pair of electrodes for sensing changes in ionization occurring within the flame whereby variations in the conductivity of the flame produced by substances introduced into the flame may be determined.

2. A system for the analysis of substances by gas chromatography including the combination of a separating column for providing an effluent corresponding to the constituents of the substances to be analyzed including non-combustible and semi-combustible materials, a pair of spaced electrodes, a chamber surrounding the spaced electrodes, a nozzle positioned adjacent the spaced electrodes, means passing a combustible material through the nozzle to produce a flame between the spaced electrodes, means introducing oxygen into said chamber to support combustion of said combustible material, means introducing the effluent from the separating column into the flame, and means passing electrical current between the spaced electrodes to determine changes in the electrical conductivity of the flame whereby the non-combustible and semi-combustible materials introduced into the flame from the separating column are detected.

3. A system for the analysis of substances by gas chromatography including the combination of a separating column for producing an effluent corresponding to the constituents of substances to be analyzed including non-combustible and semi-combustible materials, a pair of spaced electrodes insulated from one another, a nozzle positioned adjacent the spaced electrodes, a source of combustible gas connected to the nozzle for producing a flame between the electrodes, means for passing the effluent from the separating column through the nozzle into the flame, means connected to the electrodes for passing an electrical current through the flame, and means for sensing variations in current flow between the spaced electrodes whereby the semi-combustible and non-combustible materials in the effluent from the separating column are detected.

4. A system in accordance with claim 3 in which said current flow sensing means includes means for generating an electrical signal of reference value and means for developing an output indication representing the departure of the electrical signal provided by current flow between the spaced electrodes from said reference value.

5. A detector for use in conjunction with apparatus for analyzing substances by gas chromatography including the combination of a pair of spaced electrodes, means for introducing combustible gas between the spaced electrodes to form a flame, means for introducing samples of a substance to be analyzed into the flame, means connected to the electrodes for passing an electrical current through the flame, means coupled to said electrodes for developing a first electrical signal representing variations in the electrical conductivity of the flame produced by said substances, means for generating a second electrical signal having a value representing the electrical conductivity of the flame in the absence of the presence of substances to be analyzed, and means comparing said first and second electrical signals to provide an output indication corresponding to the departure of said first electrical signal from said second electrical signal whereby substances introduced into said flame are detected.

6. A flame ionization detector including the combination of a chamber, a pair of spaced electrodes positioned within the chamber, a nozzle disposed adjacent the electrodes, a first inlet connected to the nozzle to receive a combustible gas for producing a flame between the electrodes, a second inlet connected to the nozzle for receiving substances to be analyzed, a third inlet in said chamber for receiving oxygen to support the combustion of said combustible gas, an electrical circuit connected to the spaced electrodes for passing a current through the flame, an indicator connected to the electrical circuit for measuring variations in current flow between the electrodes, and means for applying a signal to the indicator establishing a zero indication corresponding to the absence of substances being introduced through the second inlet whereby an output indication is provided detecting the presence of substances introduced through the second inlet.

7. A flame ionization detector including the combination of a chamber, a pair of spaced electrodes disposed within the chamber, a nozzle disposed adjacent the spaced electrodes, an electrolytic combustible gas generator connected to the nozzle for producing a flame in the region of the electrodes, means for introducing substances to be analyzed into the flame, an electrical circuit connected to the electrodes for passing a current through the flame, and means connected to the electrical circuit for measuring variations in current flow between the electrodes produced as a function of the constituents introduced into the flame.

8. A flame ionization detector including the combination of a chamber, means for introducing substantially pure oxygen into said chamber, a nozzle disposed within the chamber, means for passing a substantially pure combustible gas through said nozzle to produce a flame within the chamber, a pair of electrodes positioned within the flame, means for passing substances to be analyzed through the nozzle into the flame, an electrical circuit connected to the spaced electrodes for passing a current through the flame, and an indicator connected to the electrical circuit for measuring variations in current flow between the electrodes whereby the substances introduced into the flame may be detected.

9. Apparatus for the chromatographic analysis of substances including the combination of a chamber, means for supplying gas of fixed combustible properties to the chamber for producing a flame within the chamber having a substantially constant value of electrical conductivity, means for supplying oxygen to said chamber to support the combustion of said flame within said chamber, at least one electrode positioned within the chamber in the region of said flame, a separating column coupled to said chamber for introducing substances to be analyzed into said flame which alter the electrical conductivity of the flame, an electrical circuit connected to the electrode for passing a current through the flame, and an indicator connected to the electrical circuit for measuring variations in current passing through the flame whereby the substances introduced into the flame may be detected.

10. Apparatus in accordance with claim 9 including means for applying a signal to the indicator establishing a predetermined indication in the absence of substances to be analyzed being introduced into the flame.

11. A detector for use in conjunction with apparatus for analyzing substances by gas chromatography including the combination of a chamber, means for introducing combustible gas into said chamber to form a flame, means for introducing oxygen into said chamber for supporting the combustion of said gas, means for introducing samples of a substance to be analyzed into the flame, electrical circuit means disposed within the flame for passing current through the flame, and an indicator coupled to the electrical means for sensing changes in ionization occurring within the flame whereby constituents of the substance introduced into the flame may be determined.

12. Apparatus in accordance with claim 11 including means for applying a signal to the indicator establishing a predetermined indication in the absence of substances to be analyzed being introduced into the flame.

13. A system for the analysis of substances by gas chromatography including the combination of a separating column for providing an effluent corresponding to the constituents of the substances to be analyzed including noncombustible and semicombustible materials, a chamber, a nozzle positioned within the chamber, means passing a combustible material through the nozzle to produce a flame, means introducing oxygen into said chamber to support combustion of said combustible material, means introducing the effluent from the separating column into the flame, electrical circuit means at least a portion of which is disposed within the flame for passing electrical current through said flame to determine changes in the electrical conductivity of the flame whereby the noncombustible and semicombustible materials introduced into the flame from the separating column are detected.

14. A system for the analysis of substances by gas chromatography including the combination of a separating column for producing an effluent corresponding to constituents of substances to be analyzed including noncombustible and semicombustible materials, at least one electrode, a nozzle positioned adjacent the electrode, a source of combustible gas connected to the nozzle for producing a flame encompassing at least a portion of said electrode, means for passing the effluent from the separating column through the nozzle into the flame, means connected to said electrode for passing an electrical current through the flame, and means for sensing variations in current passed by said electrode through the flame whereby the semicombustible and noncombustible materials in the effluent from the separating column are detected.

15. Apparatus for analyzing substances by gas chromatography including the combination of a chamber, a nozzle positioned within said chamber, a first inlet connected to the nozzle to receive a combustible gas for producing a flame, a second inlet connected to the nozzle for receiving substances to be analyzed, a separating column coupled to said second inlet for introducing an effluent into the flame corresponding to constituents of substances to be analyzed, at least one electrode positioned adjacent the nozzle, electrical circuit means connected to said electrode for passing a current through said flame, and an indicator connected to the electrical circuit means for measuring variations in current flow through said flame corresponding to substances appearing in the effluent from said separating column.

16. Apparatus in accordance with claim 15 including means for applying a signal to the indicator establishing a zero indication corresponding to the absence of substances being introduced through the second inlet whereby an output indication is provided for detecting the presence of substances introduced through the second inlet.

17. Apparatus including the combination of a chromatographic column for providing successive separated fractions of material derived from a sample, means providing a flame, means for feeding the fractions successively to the flame to be mixed therewith, spaced electrode means of material resistive to the effects of combustion and positioned at least partially within the flame, electrical circuit means coupled to the spaced electrode means for establishing an electrical circuit including at least a portion of the flame between the electrode means as a conductive path, and means coupled to the electrical circuit means for distinguishing variations in current flow from a predetermined level as the successive separated fractions are fed into the flame.

18. A gas chromatographic analysis system including the combination of a separating column for producing an effluent corresponding to constituents of substances to be analyzed, a chamber, means providing a hydrogen flame within the chamber, means for introducing the effluent from the separating column into the flame, at least one electrode positioned in the region of the flame, means for completing an electrical circuit to the electrode including at least a portion of the flame as a conductive path, and indicating means coupled to the electrical circuit path, and indicating means coupled to the electrical circuit means to detect changes in current flow therethrough.

References Cited in the file of this patent

UNITED STATES PATENTS

| | | |
|---|---|---|
| 2,112,736 | Cockrell | Mar. 29, 1938 |
| 2,324,821 | Campbell | July 20, 1943 |
| 2,343,001 | Cohen | Feb. 29, 1944 |
| 2,511,177 | Richardson | June 13, 1950 |
| 2,622,967 | Lobosco | Dec. 23, 1952 |

FOREIGN PATENTS

| | | |
|---|---|---|
| 790,217 | Great Britain | Feb. 5, 1958 |

OTHER REFERENCES

Henderson et al.: "J. Chem. Soc.," 2299–2302 (1956).
McWilliam et al.: "Nature," 181 760 (1958).
Scott: "Manuf. Chemist.," 29 411–16 (1958).